UNITED STATES PATENT OFFICE.

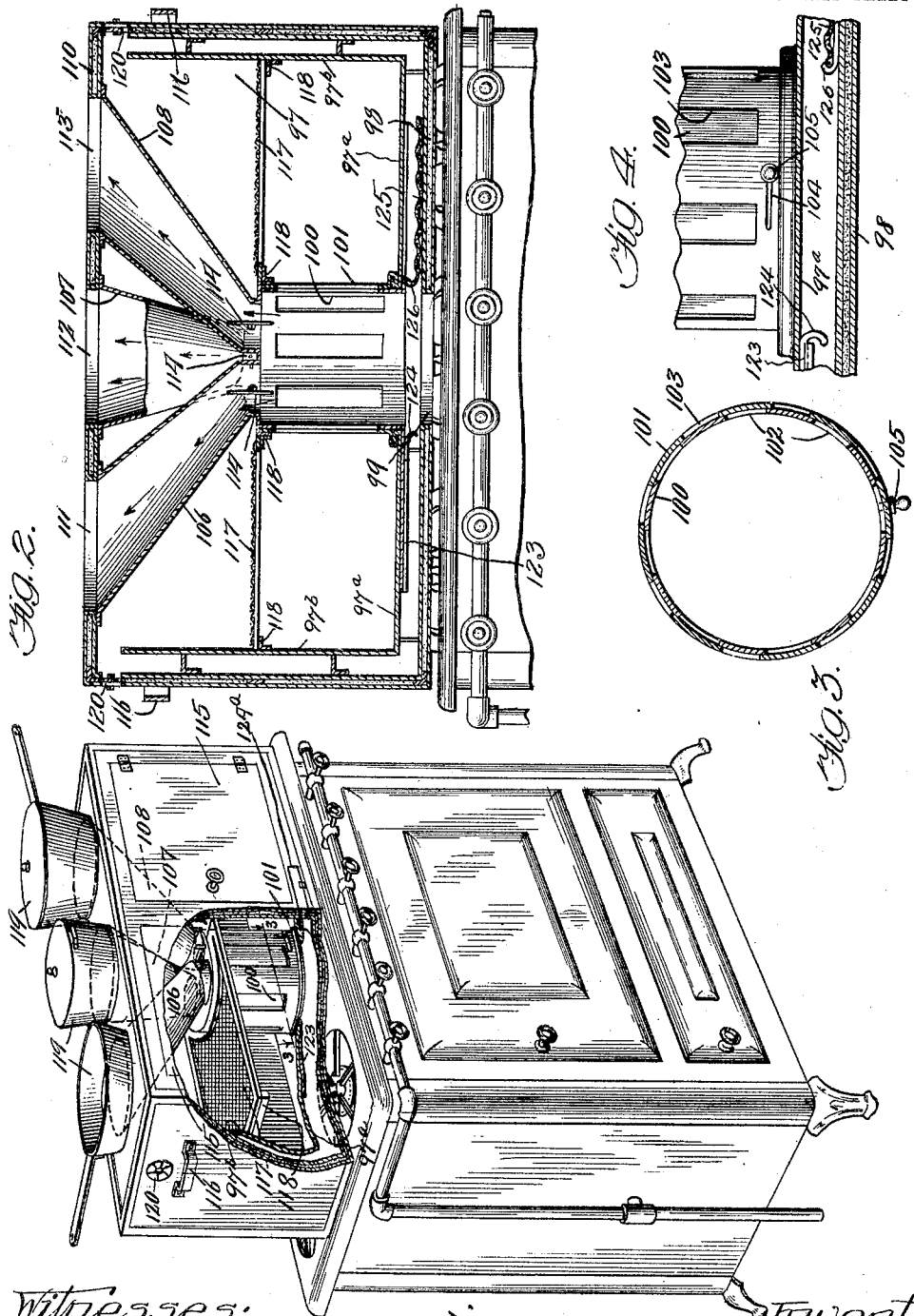

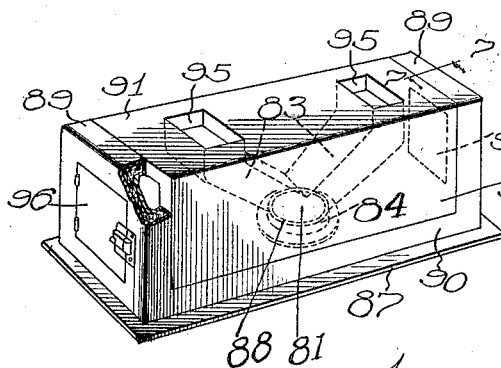

FOREST V. DETWILER, OF CHICAGO, ILLINOIS.

HEATER AND COOKER.

1,084,074.   Specification of Letters Patent.   Patented Jan. 13, 1914.

Application filed July 23, 1910. Serial No. 573,375.

*To all whom it may concern:*

Be it known that I, FOREST V. DETWILER, a citizen of the United States, residing at Chicago, in the county of Cook and State of Illinois, have invented certain new and useful Improvements in Heaters and Cookers, of which the following is a specification.

This invention relates to improvements in heaters and cookers, the surounding walls of which are heat insulated whereby the heat discharged thereinto will be retained when desired, and one of the objects of the invention is to provide an improved hollow receptacle having heat passages therethrough, and which is adapted to be used for cooking or heating articles either by placing the articles therein, or on the top thereof.

A further object is to provide improved means for controlling the heat within the cooker, and improved means whereby access may be had to the interior of the cooker.

A further object of the invention is to provide an improved cooker of this character, and improved means whereby the cooker may be adapted for cooking articles in several ways and for cooking various articles.

A further object is to provide an improved apparatus of this character which will be simple, durable and cheap in construction, and effective and efficient in operation.

To the attainment of these ends and the accomplishment of other new and useful objects, as will appear, the invention consists in the features of novelty in the construction, combination and arrangement of the several parts hereinafter more fully described and claimed, and shown in the accompanying drawings illustrating embodiments of the invention and in which—

Figure 1 is a perspective view partly broken away, of an improved heater and cooker of this character constructed in accordance with the principles of this invention. Fig. 2 is a longitudinal sectional view of the heater and cooker showing a portion of a vapor stove in elevation. Fig. 3 is a sectional view on line 3—3 of Fig. 1. Fig. 4 is a detail elevation of the lower portion of the heat drum within the cooker and heater, as shown in Figs. 1 and 2. Fig. 5 is a sectional view of a modified form of the invention. Fig. 6 is a perspective view of another form of the invention, with parts broken away to show the insulated walls. Fig. 7 is a sectional view on line 7—7 of Fig. 6. Fig. 8 is a longitudinal sectional view of another form of the invention similar to the form shown in Fig. 6, and showing the same in conjunction with a cooker, the latter being also shown in section and partly broken away.

Referring more particularly to the drawings, and in the form of the invention shown in Figs. 1 to 4, the cooker comprises a casing designated generally by the reference numeral 97, which is constructed of any suitable material and of any desired configuration, and is provided with top, bottom, side and end walls, all of which may be insulated in any desired or suitable manner. The bottom 98 of the casing is provided with an opening 99 therethrough, and surrounding this opening so as to project into the casing 97, is a heat drum comprising telescoped annular members 100, 101. The member 100 is provided with a plurality of apertures or openings 102 therethrough, and the member 101 is provided with a plurality of apertures or openings 103 therethrough and these apertures or openings 102, 103, are adapted to be brought into or out of register by the rotation of one of the members 100, 101, with respect to the other. In order to accomplish this rotation one of the members, preferably the member 101, is provided with a slot 104 therethrough and a handle 105 projects through the slot and is secured to the other member 100. The outer member 101 may be held against adjustment in any desired or suitable manner. The aperture or opening 99 and the heat drum thus formed are preferably arranged at the center of the casing 97 and the drum may be of any desired height, preferably of a height to extend some distance above the bottom 98 of the casing. Radiating from and communicating with the top of the drum are a plurality of heat passages 106, 107, 108, which preferably increase in diameter from the drum and extend upwardly toward the top 110 of the casing and the top is provided with a plurality of apertures or openings 111, 112 and 113 therethrough with which the ends of the respective heat passages register. These heat passages are preferably constructed of metal and are tubular, and may be supported and secured in position in any suitable manner. In order to control the heat and to direct the heat from the drum into any one or more of the passages and to shut off the heat from any one or more of the passages at will, suitable dampers 114 are provided one for each of the passages 106, 197, 108, and these dampers are preferably located in close proximity to the drum, and suitable handles (not shown) may be provided by means of which the dampers may be adjusted in the ordinary and well known manner. Access may be had to the interior of the casing 97 through suitable openings in one of the walls of the casing, and which openings are closed by suitable closures 115, and handles 116 may be provided by means of which the casing may be transported.

Within the casing is arranged a chamber comprising a bottom 97$^a$ spaced from the bottom 98 of the casing, and walls 97$^b$, which latter are spaced from the surrounding walls of the casing and terminate short of the top of the casing to form a heat passage. The heat drum is arranged above the bottom 97$^a$, and projects at its lower end through an opening therein, but terminates short of the bottom 98 of the casing, so that a space substantially equal to the space between the bottoms 98 and 97$^a$ will be formed between the end of the drum and the opening 99, for a purpose to be set forth. Suitable shelves 117 may be provided within the chamber, and these shelves removably rest upon suitable supports or brackets 118.

When it is desired to employ the cooker as a heat distributer by means of which heat may be distributed to a plurality of cooking utensils 119 from a single burner, which latter is located adjacent the opening 99, and which receptacles rest upon the top 110 of the casing over the respective openings 111, 112 and 113, the dampers 114 are opened and the apertures or openings 102, 103 in the annular members 100, 101, are thrown out of register to prevent heat from escaping from the sides of the drum. When the parts are thus adjusted, it will be apparent that the heat from the burner will pass through the drum and be divided and distributed equally through the heat passages 106, 107 and 108.

When it is desired to cook or heat articles by placing them within the casing, the dampers 114 may be adjusted to close the passages 106, 107 and 108, and the annular members 100, 101 adjusted with respect to each other to cause the openings 102, 103 therein to register. In this position it will be manifest that the heat cannot escape from the drum into the passages 106, 107 and 108, but will escape into the casing through the registering apertures in the drum.

In order to control the heat, dampers or ventilators 120 of the ordinary and well known construction may be provided in any one or more of the walls of the casing. It will also be apparent that the cooker may be employed for simultaneously heating the utensils 119 and for also cooking or heating articles placed within the casing and from a single burner. When it is desired to thus use the cooker, any one or more of the dampers 114 may be adjusted to open the respective passages 106, 107 and 108, and the annular members 100, 101 adjusted with respect to each other so that the openings 102, 103 therein will register. Thus adjusted, the heat from the burner will enter the drum and a portion of the heat will be discharged through the registering openings directly into the casing 97 and other portions thereof will be equally distributed through the passages 106, 107, the dampers of which are adjusted to open the passages.

Slidably mounted upon any suitable support, preferably to one side of the heat drum, is a damper 123 which is adapted to be slid across the opening at the bottom of the heat drum, which forms a central passageway through the casing, and a thumb hold 124 is provided by means of which the damper 123 may be thus adjusted. Access may be had to this thumb-hold 124 through a small door opening in the front of the casing and which opening has a closure 124$^a$. Slidably mounted upon a suitable support, preferably the upper face of the bottom wall 98 of the casing, is a grating or toaster 125 which may be drawn across the central opening by means of a thumb-hold 126 for toasting bread or other articles, and when thus adjusted, the bread or other articles may be placed upon the toaster or grating through the door 124$^a$ of the casing. The grating being spaced below the bottom of the heat drum, will permit the articles to be placed thereon.

When the damper 123 is adjusted so as to close the inlet opening of the heat drum, the heat entering the casing through the opening 99 will be directed into the passages between the walls of the casing and the inner chamber, and will be discharged into the inner chamber over the top of the inner walls 97$^b$, so that articles placed within the inner chamber may be baked, the heat within the inner chamber being controlled by the ventilators 120. When the grating or toaster is adjusted so as to extend across the inlet opening of the heat drum, the heat will enter the heat drum and will be discharged out of the top of the casing through the openings 111, 112 and 113.

In the form of the invention shown in Fig. 6, the cooker comprises a base 87, which is provided with an opening 81 therethrough, and a flange 88, which surrounds the opening and projects above the top of the base. Insulating walls 89 project above the base and are spaced from each other, and these walls may be connected by intermediate members 90. A hood 91 is provided to form a closure for the space between the walls 89. This hood 91 is provided with sides 92, and is of a size and configuration to substantially fill the space between the walls 89, so that the outer faces of the sides 92 will be substantially flush with the sides of the end walls, while the top of the hood is substantially flush with the upper edges of the end walls 89. This hood is removably supported in position in any desired or suitable manner, preferably by means of the ends thereof being flanged, as at 93, and adapted to engage flanged portions 94 on the end walls 89. A heat distributer is arranged within the casing thus formed, and comprises two tubular branches or passages 83, which are connected with each other and terminate in a tubular portion 84. This portion 84 is adapted to be telescoped over the flange 88, the extremities of the branches or passages 83 terminating adjacent and communicating with openings 95 in the top of the hood 91. In order to control the heat and to direct it through one of the openings 95 and to prevent its passing through the other of the openings 95, any suitable mechanism may be provided, such as a damper 85, which is omitted from Fig. 6 for the sake of clearness but is shown in Fig. 8. This damper is preferably pivotally mounted between the adjacent extremities of the passages 83, and is adapted to be swung into such positions as to close one of the passages 83, and to permit the other to remain open. The damper may be adjusted by means of a suitable handle 86 located on the outside of the passages, to which access may be had from the interior of the casing. In order to gain access to the interior of the casing thus formed, suitable door openings provided with closures 96 are arranged in the end walls 89. Cooking utensils may be placed upon the top of the casing, and will be heated by means of the heat passing through the passages 83 and the openings 95.

It will be manifest that considerable heat will be radiated from the exterior surfaces of the heat passages 83, and in order to confine and utilize this heat, the hood 91 is provided. By providing doors or closures 96, the space within the casing may be employed for cooking or heating purposes, and to this end the articles may be placed within the casing through the doors 96, and when in place, will not interfere with the cooking of the articles in the utensils arranged over the openings 95. The hood is insulated in any desired or suitable manner, and as the end walls 89 are also insulated, it will be apparent that a considerable amount of heat will be retained within the casing, while at the same time the outer surface of the closure will not become very hot.

This cooker may be employed with a vapor stove or range of any ordinary and well known construction, by placing the casing so that one of the burners will be located beneath the opening 81, or, if desired, a special burner may be employed for this purpose.

In the form of invention shown in Fig. 5 the heat drum 127 communicates with the opening 99 in the bottom of the casing and its upper extremity communicates with an enlarged chamber 128 adjacent the top of the casing. The top of this chamber 128 is provided with openings 129 which communicate with the openings 111, 112 and 113, in the top of the casing, and the top of the chamber stands in close proximity to the inner face of the top wall of the casing. The chamber 128 extends beyond the sides of the heat drum 127 and preferably terminates short of the walls 97$^b$ of the inner chamber of the casing. In this form of the invention it will be apparent that when the damper 123 is open heat entering through the opening 99 will enter the heat drum 127 from where it will pass into the chamber 128. From this chamber the heat will find its way through the openings 129 and out of the openings 111, 112, 113. When the damper 123 is adjusted to close the entrance opening of the heat drum 127, the heat will pass into the space between the walls of the casing and the inner chamber and will be discharged into the inner chamber over the top of the walls 97$^b$.

In the form of the invention shown in Fig. 8, the cooker is shown in conjunction with another form of cooker, the latter embodying insulating walls 21 and 27, and is provided with an opening to receive a cooker constructed in accordance with this invention. The latter in this form of the invention comprises a bottom plate 74 and a top plate 78 spaced from the bottom plate by means of uprights 31 so as to form a space between the plates for the reception of an article. The tubular passages 83 which are connected with the tubular portion 84 are arranged between the plates 74, 78. The tubular portion 84 telescopes with the flange 88 surrounding the opening 81 in the bottom or base plate 74 and the branches 83 communicate with openings 79 in the top plate 78. This form of cooker is adapted to be inserted into another cooker as shown in Fig. 8 or to be used independently and when so used the openings 79 constitute stove holes upon which articles may be placed in a manner similar to that shown in Fig. 1. The space between the plates 74, 78, when the cooker is used as just specified, is adapted to receive articles, which latter will be kept warm by the radiation of the heat from the tubular members 83.

What is claimed as new is—

1. A hollow casing provided with an opening in one wall, a tubular member within the casing communicating with the said opening and being provided with a plurality of branches, each opening through the wall of the casing opposite to the first said wall and at different points, the last recited openings forming stove holes, said tubular member and branches forming communicating heat passages for conducting heat through the casing and to the stove holes, means adjacent the inlets of the branches for controlling the passage of heat through the branches, there being a door opening in the wall of the casing independent of the other openings and a closure for the door opening.

2. A hollow casing provided with an opening in one wall, a tubular member within the casing communicating with the said opening and being provided with a plurality of branches each opening through the wall of the casing opposite to the first said wall and at different points, said tubular member and branches forming communicating heat passages through the casing, there being a door opening in the wall of the casing independent of the other openings, and a closure for the door opening.

3. A hollow casing provided with an opening in one wall, a tubular member within the casing communicating with the said opening and being provided with a plurality of branches each opening through the wall of the casing opposite to the first said wall and at different points, said tubular member and branches forming communicating heat passages through the casing, there being a door opening in the wall of the casing independent of the other openings, a closure for the door opening, and means for controlling the passage of heat through the casing.

4. A hollow casing provided with openings in the top and bottom thereof, a tubular member within the casing and forming a communicating passage between the said openings for conducting heat through the casing, a damper for the tubular member to control the entrance of heat into one end of the member, a portion of the tubular member intermediate the damper and the inlet end of the passage being provided with an opening through the wall thereof whereby heat may be discharged directly into the casing, means other than the said damper for controlling the last said passage, and means whereby access may be had to the interior of the casing.

5. A hollow casing provided with openings in the top and bottom thereof, a tubular member within the casing and forming a communicating passage between the said openings for conducting heat through the casing, means for shutting off a portion of the passage to the heat, another portion of the passage being provided with means whereby the heat may be discharged therefrom and directly into the interior of the casing, the last said means embodying telescoping members provided with apertures therein adapted to be brought into and out of register, and means whereby access may be had to the interior of the casing.

6. A hollow casing provided with openings in the top and bottom thereof, a tubular member within the casing and forming a communicating passage between the said openings for conducting heat through the casing, means for shutting off a portion of the passage to the heat, another portion of the passage being provided with means whereby the heat may be discharged therefrom and directly into the interior of the casing, the last said means embodying telescoping members provided with apertures therein adapted to be brought into and out of register, means for thus adjusting the telescoping members, and means whereby access may be had to the interior of the casing.

7. A hollow casing provided with openings through the top and bottom thereof, the said top and the said bottom being provided one with a single opening and the other with a plurality of openings, means forming a heat passage through the casing and comprising a tubular body and a plurality of branches leading therefrom, said tubular member and branches communicating respectively with the said single and plurality of openings, dampers adjacent the inlet ends of the said branches for shutting off the heat therefrom and for confining the heat within the said tubular body, the said tubular body being provided with an opening therethrough whereby heat confined therein may be discharged directly into the casing, means for opening or closing the last said opening at will, and means whereby access may be had to the interior of the casing.

8. A hollow casing provided with openings through the top and bottom thereof, the said top and the said bottom being provided one with a single opening and the other with a plurality of openings, means forming a heat passage through the casing and comprising a tubular body, and a plurality of branches leading therefrom, said tubular member and branches communicating respectively with the said single and plurality of openings, dampers adjacent the inlet ends of the said branches for shutting off the heat therefrom and for confining the heat within the said tubular body, the said tubular body comprising telescoping members, one of which is rotatable with respect to the other and provided with apertures through their walls adapted to be brought into and out of register, means for thus adjusting the members, and means whereby access may be had to the interior of the casing.

9. A hollow casing provided with openings in the top and bottom thereof, a tubular member within the casing and forming a communicating passage between the said openings for conducting the heat through the casing, means for shutting off a portion of the passage to the heat, another portion of the passage being provided with means whereby the heat may be discharged therefrom and directly into the interior of the casing, means for controlling such discharge of heat at will, and means whereby access may be had to the interior of the casing.

10. A hollow casing provided with openings in the top and bottom walls thereof, a chamber within the casing having sides and bottom spaced from the walls of the casing, said bottom being provided with an opening registering with an opening in one of the walls of the casing, a tubular member within the chamber forming communication between the opening in the bottom of the chamber and the opening in the opposite wall of the casing, the space between the walls of the casing and the chamber having communication with the interior of the chamber to form a passage for heat entering the casing through the opening in the bottom of the casing, and means for closing the tubular member to the heat, at will, to direct the heat into the space between the walls of the casing and chamber.

11. A hollow casing provided with an opening in the top and bottom walls thereof, a chamber within the casing having sides and bottom spaced respectively from the walls of the casing, said bottom being provided with an opening registering with the opening in one of the walls of the casing, a tubular member within the chamber forming communication between the opening in the bottom of the chamber and the opening in the opposite wall of the casing, the space between the walls of the casing and the chamber having communication with the interior of the chamber to form a passage for heat entering the casing through the opening in the bottom of the casing, means for closing the entrance opening of the tubular member at will to direct the heat into the space between the walls of the casing and the chamber, and means other than the last recited means for controlling the temperature within the casing.

12. A hollow casing provided with openings in the top and bottom walls thereof, a chamber within the casing having sides and bottom spaced from the walls of the casing, said bottom being provided with an opening registering with an opening in one of the walls of the casing, a tubular member within the chamber forming communication between the opening in the bottom of the chamber and the opening in the opposite wall of the casing, the space between the walls of the casing and the chamber having communication with the interior of the chamber to form a passage for heat entering the casing through the opening in the bottom of the casing, and a damper adjustably supported in the space between the bottom of the chamber and the casing and adapted to close the entrance opening of the tubular member to direct the heat into the space between the walls of the casing and chamber.

13. A hollow casing provided with openings in the top and bottom walls thereof, a chamber within the casing having sides and bottom spaced respectively from the walls of the casing, said bottom being provided with an opening registering with the opening in one of the walls of the casing, a tubular member within the chamber forming communication between the opening in the bottom of the chamber and the opening in the opposite wall of the casing, the space between the walls of the casing and the chamber having communication with the interior of the chamber to form a passage for heat entering the casing through the opening in the bottom of the casing, a damper adjustably supported in the space between the bottom of the chamber and the casing and adapted to close the entrance opening of the tubular member to direct the heat into the space between the walls of the casing and chamber, and means other than said damper for controlling the temperature within the casing.

14. A hollow casing provided with openings in the top and bottom walls thereof, a chamber within the casing having sides and bottom spaced respectively from the walls of the casing, said bottom being provided with an opening registering with an opening in one of the walls of the casing, a tubular member within the chamber forming communication between the opening in the bottom of the chamber and the opening in the opposite wall of the casing, the space between the walls of the casing and the chamber having communication with the interior of the chamber to form a passage for heat entering the casing through the opening in the bottom of the casing, and a grating or toaster adjustably supported within the space between the bottoms of the casing and chamber and adapted to be adjusted across the inlet opening of the casing, said grating or toaster being spaced from the inlet end of the tubular member and also from the bottom of the chamber.

15. A hollow casing provided with openings in the top and bottom walls thereof, a chamber within the casing having sides and bottom spaced respectively from the walls of the casing, said bottom being provided with an opening registering with an opening in one of the walls of the casing, a tubular member within the chamber forming communication between the opening in the bottom of the chamber and the opening in the opposite wall of the casing, the space between the walls of the casing and chamber having communication with the interior of the chamber to form a passage for heat entering the casing through the opening in the bottom of the casing, and a grating or toaster adjustably supported within the space between the bottoms of the casing and chamber and adapted to be adjusted across the inlet opening of the casing, said grating or toaster being spaced from the inlet end of the tubular member and also from the bottom of the chamber.

16. A cooking apparatus embodying top and bottom members spaced from each other to form a space for the reception of articles therebetween, said bottom member being provided with an opening therethrough, a tubular member arranged between the top and bottom members and having communication with the said opening, the top member being provided with a plurality of stove holes, said tubular member being provided with branches communicating respectively with the stove holes, and one or more dampers for controlling the passage of the heat through the said branches.

17. A device of the class described, embodying an oven having an opening through one wall, heat flues in the walls communicating with said opening, said flues also having communication with the interior of the oven, another heat flue within the oven communicating with said opening and discharging through another wall of the oven to form a heat passage directly through the oven, and means for closing the entrance opening of the last recited flue to direct the heat into the first said flues.

18. A device of the class described, embodying an oven having an opening through one wall, one or more heat flues in the walls communicating with said opening, said flues also having communication with the interior of the oven, another heat flue within the oven communicating with said opening and discharging through another wall of the oven to form a heat passage directly through the oven, means for closing the entrance opening of the last recited flue to direct the heat into the first said flue or flues, and means for ventilating the oven.

19. A device of the class described, embodying an oven having an opening through one wall, one or more heat flues in the walls communicating with said opening, said flues also having communication with the interior of the oven, another heat flue within the oven communicating with said opening and discharging through another wall of the oven to form a heat passage directly through the oven, means for closing the entrance opening of the last recited flue to direct the heat into the first said flue or flues, and means whereby the second recited flue may be opened directly to the oven.

20. A device of the class described, embodying an oven having an opening through one wall, one or more heat flues in the walls communicating with said opening, said flues also having communication with the interior of the oven, another heat flue within the oven communicating with said opening and discharging through another wall of the oven to form a heat passage directly through the oven, means for closing the entrance opening of the last recited flue to direct the heat into the first said flue or flues, the second recited flue being provided with a heat outlet discharging directly into the oven, and means for closing said outlet, at will.

21. A device of the class described, embodying an oven having an opening through one wall, one or more heat flues in the walls communicating with said opening, said flue or flues also having communication with the interior of the oven, another heat flue within the oven communicating with said opening and discharging through another wall of the oven to form a heat passage directly through the oven, means for closing the entrance opening to the last recited flue to direct the heat into the first said flues, means for shutting off only a portion of the second recited flue to the heat, another portion of said flue being provided with means whereby the heat may be discharged therefrom directly into the interior of the oven, means for controlling the last said means at will, and means whereby access may be had to the interior of the casing.

In testimony whereof I have signed my name to this specification, in the presence of two subscribing witnesses, on this 18th day of July, A. D. 1910.

FOREST V. DETWILER.

Witnesses:
CHARLES H. SEEM,
A. O. KNIGHT.

Copies of this patent may be obtained for five cents each, by addressing the "Commissioner of Patents, Washington, D. C."